US007461783B2

(12) United States Patent
Rostosky

(10) Patent No.: US 7,461,783 B2
(45) Date of Patent: Dec. 9, 2008

(54) SHOPPING LIST GENERATOR

(76) Inventor: Michael John Rostosky, 4390 Clearwater Way #602, Lexington, KY (US) 40515

( * ) Notice: Subject to any disclaimer, the term of this patent is extended or adjusted under 35 U.S.C. 154(b) by 471 days.

(21) Appl. No.: 11/029,065

(22) Filed: Jan. 4, 2005

(65) Prior Publication Data

US 2006/0144936 A1 Jul. 6, 2006

(51) Int. Cl.
*G06K 15/00* (2006.01)

(52) U.S. Cl. .................................. 235/383; 235/472.01

(58) Field of Classification Search ................. 235/383, 235/384, 379, 472.01, 472.02, 472.03
See application file for complete search history.

(56) References Cited

U.S. PATENT DOCUMENTS

2002/0139846 A1 * 10/2002 Needham et al. ............ 235/383

OTHER PUBLICATIONS

Roy Want, "RFID A Key to Automating Everything", Scientific American, Jan. 2004, pp. 56-65. Published in New York by Scientific American, Inc.

* cited by examiner

*Primary Examiner*—Karl D. Frech
(74) *Attorney, Agent, or Firm*—David G. Herold

(57) ABSTRACT

A stand-alone shopping list generator comprises a UPC scanner, a product database, a system controller, and a printer. The UPC scanner reads product identification codes encoded on UPC labels from exhausted products and sends the product identification codes to a system controller. The system controller retrieves product descriptions associated with the product identification codes from the product database. Product descriptions for scanned products are printed forming a shopping list.

In a similar embodiment of the invention, an RFID reader replaces the UPC scanner, reading the product identification codes from products labeled with RFID tags.

In another embodiment, a link delivers the shopping list to a personal digital assistant (PDA). In this embodiment, the shopping list is accumulated in non-volatile memory within the shopping list generator for later transfer to the PDA. Initiation of the transfer of the shopping list to the PDA may be by controls on the shopping list generator or may be initiated by the PDA. Clearing of the accumulated shopping list within the shopping list generator may be initiated by a dedicated control on the shopping list generator or by the PDA.

12 Claims, 6 Drawing Sheets

6 14141 00044 9

FIG. 3A

| GTIN Digit | N14 | N13 | N12 | N11 | N10 | N9 | N8 | N7 | N6 | N5 | N4 | N3 | N2 | N1 |
|---|---|---|---|---|---|---|---|---|---|---|---|---|---|---|
| EAN-13 | 0 | X | X | X | X | X | X | X | X | X | X | X | X | C |
| UPC-A | 0 | 0 | X | X | X | X | X | X | X | X | X | X | X | C |
| EAN-8 | 0 | 0 | 0 | 0 | 0 | 0 | X | X | X | X | X | X | X | C |
| Check Digit Multiplier | 3 | 1 | 3 | 1 | 3 | 1 | 3 | 1 | 3 | 1 | 3 | 1 | 3 | 0 |

FIG. 3B

SHOPPING LIST GENERATOR

BACKGROUND

1. Field of Invention

The present invention is related to shopping list generators, in general, and more particularly to stand-alone shopping list generators that use scanned product identifying labels as input.

2. Description of Prior Art

Many products sold in the United States today are labeled with machine-readable universal product code (UPC) labels. The machine readable UPC label displays a bar code that encodes a unique product identification code associated with the labeled item. A product database is necessary to associate the product identification code with specific product information such as manufacturer, name, sized, color, and etc.

UPC barcode symbology encodes the product identification code into the width of and spacing between a series of vertical bars. Each bar width and each space between bars is called an element of the barcode. UPC barcodes are read with an optical scanner that illuminates the label and measures the barcode element sizes in the reflected light. The product identification code is decoded from the element sequence.

In the UPC system, widely used in retail sales, products are assigned a product identification code called a global trade item number (GTIN). The GTIN is a 14-digit number. The most significant digit, digit 14, is called the indicator digit and is used to indicate packaging level. The indicator digit is always zero for items packaged and labeled for retail sale. The next most significant digit, digit 13, is part of the manufacturer's identification code. The barcode label encodes the significant (nonzero) digits of the assigned GTIN. Barcode symbologies widely used in retail product labeling are UPC-A, EAN-13, and EAN-8, which encode twelve, thirteen, and eight significant digits respectively. Digit 13 is always zero in GTINs assigned to companies using the UPC-A symbology. GTINs assigned to companies using the EAN-8 symbology always have 6 zeroes. In this way the chosen barcode symbology encodes all of the significant (nonzero) digits of the assigned GTIN.

A developing technology in product labeling is radio frequency identification (RFID) technology. RFID labels, also called RFID tags, are electronic labels, programmed with a product identification code. An RFID reader illuminates the RFID label with a radio frequency signal transmission. The RFID label receives energy from the illumination signal and uses the received energy to transmit its product identification code back to the RFID reader. RFID labeling is currently more expensive than barcode labeling, but is finding uses in product labeling for higher end products. RFID technology is already used in supply chain management and will eventually be widely used for individual product identification. A leading RFID system uses the same GTIN numbers assigned for use with UPC labels. RFID labels can accommodate numbers larger than fourteen digits. These labels may encode a product serial number in addition to the GTIN product identification number, allowing individual products to be tracked.

Personal digital assistants (PDAs) are electronic organizers widely used to keep track of personal information. PDAs offer personal scheduling, and handy to do list functions. Most PDAs provide interfaces for rapid transfer of information into and out of the PDA. An infrared interface called IrDA is widely available on PDAs for line-of-sight transfer of data. Radio frequency (RF) interfaces such as Bluetooth and WiFi are available on many PDAs and offer flexible data transfer at distances up to several hundred feet.

Before UPC product labeling, products on store shelves were individually marked with a price tag. The price was entered into a cash register that totaled the cost of products purchased. Product inventory was counted by hand regularly to determine what to reorder.

Since the advent of UPC labeling, the point of sale terminal has become part of a sophisticated computer system that tracks product price and inventory instantly. Labor costs associated with inventory are down and inventory accuracy is much improved. Efficiency gains throughout the supply chain have been realized.

In contrast, consumers still write shopping lists manually, with pencil and paper. A shopping list is often written from the memory of what was consumed and a quick scan of pantry shelves. The manual process is imperfect leading to forgotten products and extra shopping trips.

What is needed is a stand-alone shopping list generator that is small enough and durable enough to operate in the environment where products are consumed and discarded. The prior art does not provide for a stand-alone device that will generate a shopping list from scanned items.

OBJECTS AND ADVANTAGES

It is therefore an object of the present invention to provide a stand-alone device that prints a shopping list from scanned items.

It is a further object of the invention to generate a shopping list from items marked with RFID labels.

It is a further object of another embodiment of the invention to deliver the shopping list directly to a personal digital assistant (PDA).

SUMMARY

A shopping list generator consists of a UPC scanner connected to a system controller, said system controller also connected to a nonvolatile database memory and a printer. As UPC labels are scanned, the product identification code is read and associated product information retrieved from the database memory. The product information is printed to form a shopping list.

An extension of the shopping list generator replaces the UPC scanner with an RFID scanner. The RFID scanner reads product identification codes from products labeled with RFID tags.

In another embodiment of the current invention, the printer is replaced by a link to a PDA. The shopping list generator accumulates the shopping list from products scanned. The shopping list is downloaded to the PDA. Upon successful downloading of the shopping list to the PDA, the accumulated shopping list may be cleared in the shopping list generator.

BRIEF DESCRIPTION OF THE DRAWINGS

FIG. 3A depicts a UPC-A label

FIG. 3B is a table relating UPC barcode symbologies with GTIN numbering

DESCRIPTION OF THE PREFERRED EMBODIMENT

Figure 1:
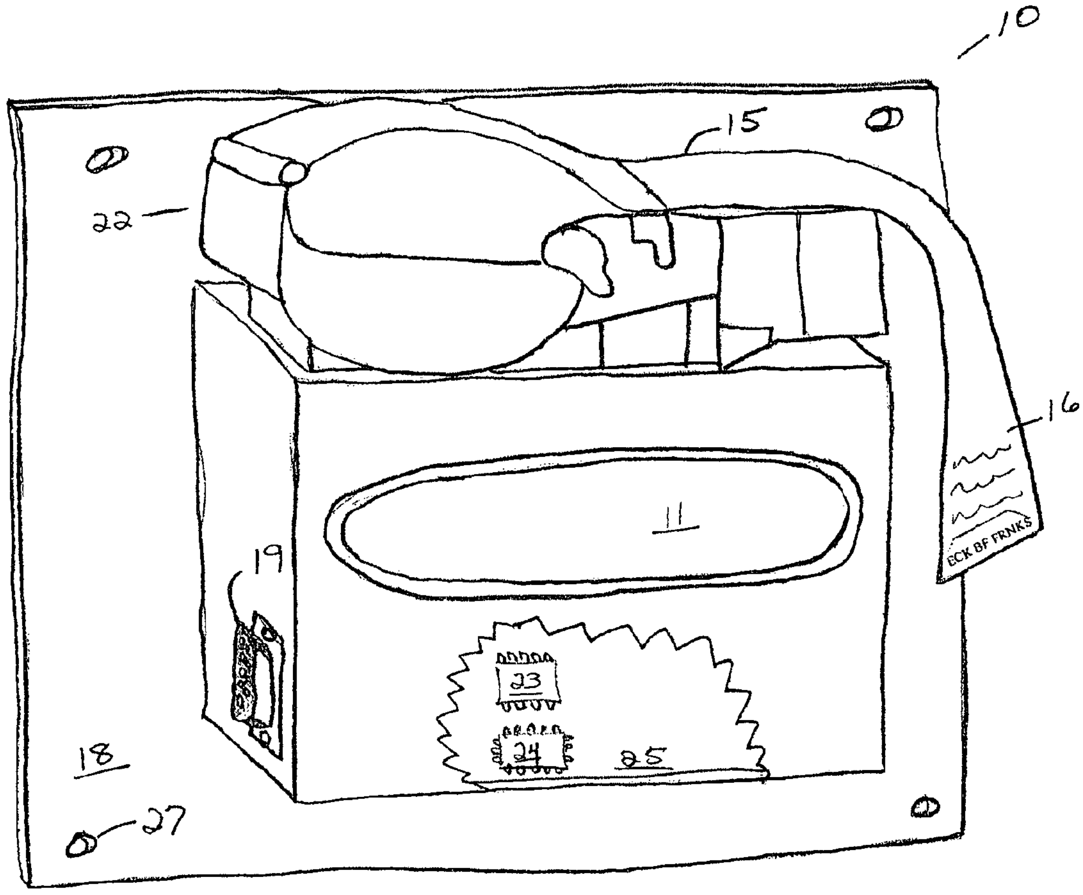
FIG. 1 depicts the shopping list generator.

FIG. 1 depicts the preferred embodiment of the shopping list generator. Shopping list generator 10 comprises a UPC label scanner 11 electrically connected to system controller 23 through printed circuit board 25. The UPC label scanner scans a product marked with a UPC label and recovers the encoded product identification code. The product identification code uniquely identifies the product displaying the label. System controller 23 receives the product identification code from the scanner and retrieves a product description corresponding to the product identification code from product database 24. The product description may include information such as manufacturer, product name, size, color, and etc. Printer 22 prints the product description on printer paper 15. Each product scanned produces a one-line printed product description. Shopping list 16 is the accumulation of the printed product descriptions of scanned items. Printer 22 has a serrated edge to facilitate removal of shopping list 16.

The components of shopping list generator 10 are mounted on base plate 18 which provides mounting means 27 for locating the shopping list generator near the flow of exhausted goods, such as close to a pantry or trash can, for example. A small wall transformer (not shown) powers the preferred embodiment of shopping list generator 10. The shopping list generator may alternately be battery powered.

Serial port 19 provides an interface through which updates are made to product database memory 24. New products can be added to the product database and database errors fixed by incrementally updating the database. An entirely new database may also be downloaded to the shopping list generator through serial port 19.

While the example of FIG. 1 uses a UPC scanner to identify products, the present invention should not be so limited. Product labels based on radio frequency identification (RFID) tags or other technologies can provide substantially the same function of machine readable product identification.

Also in the example of FIG. 1, the generated shopping list 16 is a grocery shopping list. The present invention should not be limited to grocery lists, but should include any application of a stand-alone product label scanner producing a restocking list, a list of items to be replaced.

Figure 2:
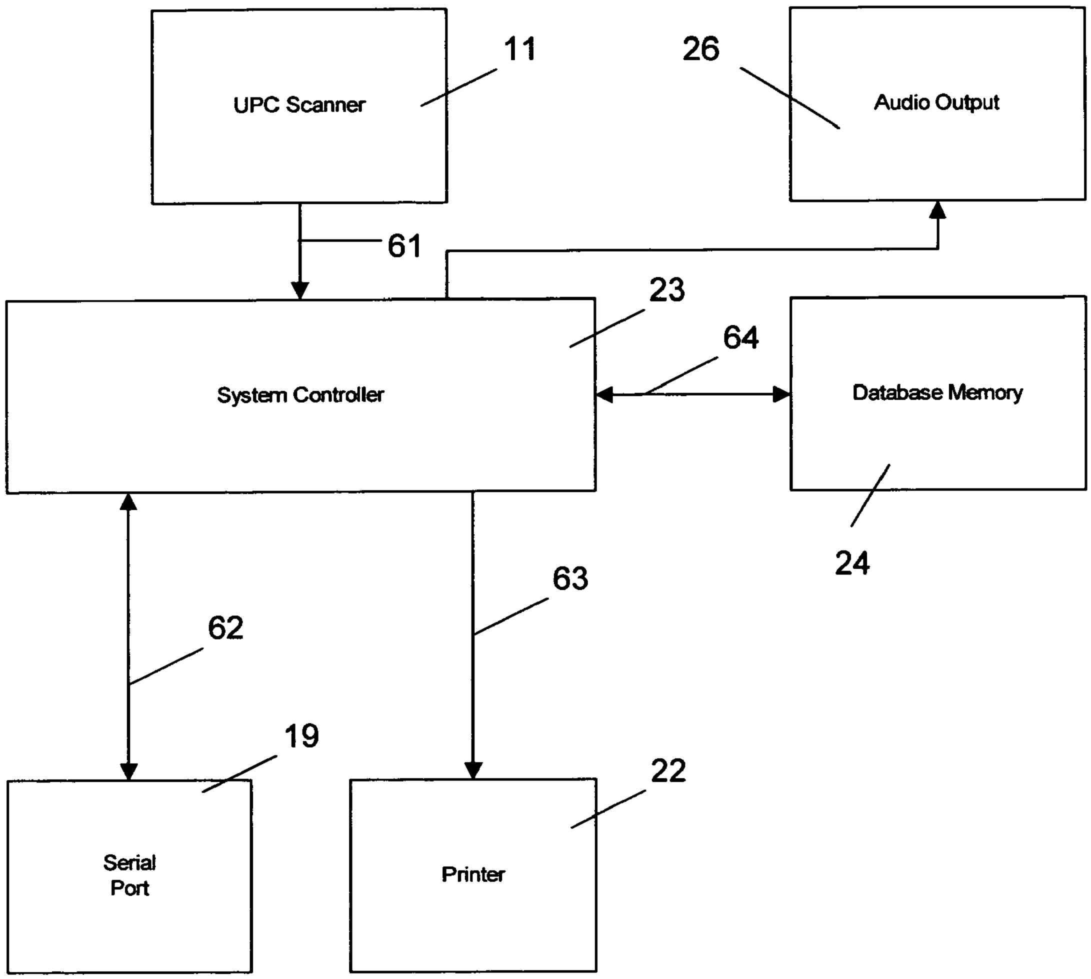
FIG. 2 is a block diagram of the preferred embodiment of the shopping list generator.

FIG. 2 depicts a block diagram of the preferred embodiment of shopping list generator 10. At the center of the block diagram is system controller 23 which is operatively connected to scanner 11, database memory 24, printer 22, audio output 26, and asynchronous serial port 19 to produce a shopping list 16 of products scanned by scanner 11. System controller 23 may be an Atmel 87C52X2 microcontroller, which contains internal program memory for executing a stored program and data memory for storing intermediate results. The 87C52X2 also contains on-board electrical interfaces for communicating with external devices, including, two asynchronous serial interfaces, bit outputs that set the value of a digital signal under program control, hit inputs that read the value of a digital signal under program control, and a clock input that causes a particular program sequence to run on each occurrence of an edge transition.

Scanner 11 is a Charge Coupled Device (CCD) barcode scanner. The scanner illuminates the barcode, identifies the barcode elements in the reflected light, and decodes the product identification code. Scanner 11 sends the product identification code to system controller 23 via the known wedge interface that mimics a computer keyboard interface on interface 61. The preferred embodiment uses Informatics Wasp barcode scanner.

Database memory 24 may be an Atmel AT45DB161B 16-megabit flash memory chip. The flash memory interface is bit-serial, consisting of control signals, data input and output signals, and a clock signal for synchronizing data transfers . Memory control, data, and clock lines are connected to bit inputs and bit outputs of system controller 23. System controller 23 clocks commands into memory 24 and clocks data in and out. System controller 23 reads memory 24 during database retrieval operations and reads and writes to database memory 24 while performing database update operations.

Printer 22 is Model EPM205-MRS from Advanced Printing Systems, in the preferred embodiment. Interface 63 between the system controller and the printer is asynchronous serial data. Printer 22 accepts alphanumeric characters through the serial interface and prints each character on paper 15. In addition, printer 22 accepts a linefeed character, advancing the paper by one line when received, and the carriage return character, moving the print mechanism to the start of the line when received. System controller 23 sends carriage return and linefeed characters to printer 22 at the beginning of each line before printing the product description. Printer 22 has a serrated edge on the paper cover for tearing shopping list 16 from the remaining paper 15.

RS-232 port 19 interfaces system controller 23 to an external data source for database memory 24 maintenance. Products may be added to database memory 24, product descriptions updated, or an entirely new database may be programmed into database memory 24. RS-232 port 19 consists of an RS-232 level translator and a DCE serial connector. Interface 62 is asynchronous serial data.

Printed circuit board 25 provides interconnection wiring for the circuitry and mounting for RS-232 port 19 connector.

UPC Labels and GTIN Numbers

FIG. 3A depicts a typical UPC label. The UPC label comprises a barcode encoding a product identification code, and the product identification code printed below the barcode. The product identification code encoded in a UPC product label is a global trade item number (GTIN) which is a unique product identification code assigned to a particular product. The assigned GTIN is a 14-digit number, some digits are assigned to identify the product manufacturer, some are assigned by the manufacturer to identify a particular product and the last digit is a check digit, calculated from the previous digits, and used to validate the GTIN. FIG. 3B is a table relating the barcode symbologies, generally used in retail product labeling, to the GTIN number. For each label symbology in the left-hand column, an X indicates a digit encoded by the symbology, a zero indicates a leading zero not encoded by the symbology, and the C signifies the check digit. Products labeled for retail sale are assigned GTIN numbers with digit N14 having a value of zero. In addition, products labeled for retail sale in the United States have historically been assigned GTIN numbers with digit N13 having a value of zero. In this way, GTIN numbers may be encoded with symbologies encoding fewer than fourteen digits. The symbologies generally used for retail product labeling are UPC-A, a twelve digit symbology, EAN-13, a thirteen digit symbology, and EAN-8, an eight-digit symbology. Products to be labeled with UPC-A and EAN-13 labels are assigned GTIN numbers with a maximum of twelve or thirteen significant digits, respectively. Small products may be labeled with an EAN-8 label, which encodes a GTIN with at most eight significant digits.

The last digit in each GTIN is the check digit. The check digit, used for validation of the GTIN, is a redundant digit calculated from the other digits of the GTIN. The check digit is calculated as follows. Each digit in the GTIN is multiplied by the corresponding check digit multiplier shown in the bottom row of FIG. 3B. The products are summed together and the least significant digit of the sum is subtracted from the number ten, the result is the check digit. Validation of a GTIN consists of comparing the received check digit with the calculated check digit.

Assignment of GTIN numbers is coordinated worldwide to assure uniqueness in the correspondence between a product and its assigned GTIN. The GTIN has enough digits to identify nearly one trillion different retail products.

Scanner

UPC scanner 11 is a CCD scanner for reading UPC labels. When scanner 11 successfully reads a label, meaning that the check digit read from the label matches the calculated check digit, the GTIN number is sent to system controller 23. Scanner 11 recognizes more barcodes than those implemented in the preferred embodiment.

The preferred embodiment produces distinctive audible tones for successful and unsuccessful scans. Audio output 26 produces a success tone when a UPC label is read and a line is printed on shopping list 16 by printer 22. An unsuccessful scan, such as an unsupported barcode symbology results in a scan failure tone from audio output 26.

Many other types of UPC scanners exist from contact scanners that require the barcode to be in physical contact with the scanner as it is moved past, to models that have a moving laser that will scan a stationary UPC label. Any of these models perform the necessary function of producing a product identification code from a UPC label. The present invention should be construed to include these variations.

Database

The product description database consists of database memory 24 and a software search algorithm running on processor 23. The product description database retrieves a product description corresponding to a given product identification code. In the preferred embodiment, database memory 24 is partitioned into an area containing product descriptions and an area containing product identification codes. The product identification code area forms a searchable database key. The search algorithm searches the database key for a match to a given product identification code and returns the product description corresponding to the product identification code.

Database Memory

Database memory 24 is contained in flash memory. Flash memory is nonvolatile semiconductor technology that retains its programmed contents through power cycles until reprogrammed. The contents of database memory 24 can be updated as needed to accommodate new product identification codes. A typical grocery store stocks approximately 30,000 separate items. Database memory 24 used in the preferred embodiment has a capacity of 50,000 product identification codes and associated product descriptions.

Figure 4:
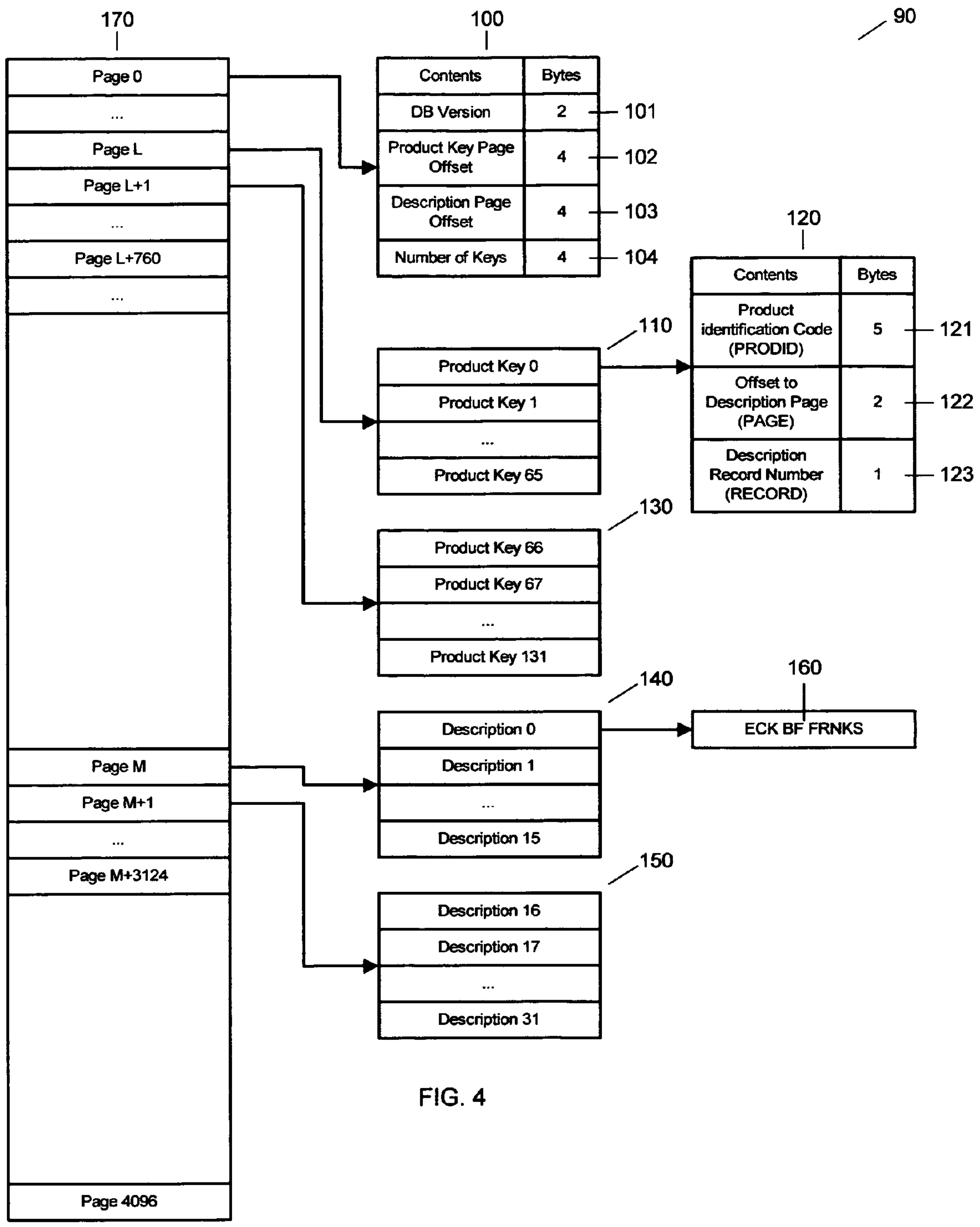
FIG. 4 depicts database memory layout

Database memory 24 contains 4096 flash memory pages, each page comprising five hundred twenty eight bytes of memory. Each flash memory page is erasable and reprogrammable independently. FIG. 4 shows the database memory contents overlaid on flash memory pages.

The database relates product identification codes to product descriptions. The database is divided into two sections, 1) a searchable product key section, and 2) a product description section. Table 170 shows the flash memory pages contained in flash memory 24. As shown in flash memory page table 170, product descriptions begin in flash memory page M. Flash memory pages M through M+3124 are allocated to product descriptions. Each product description is thirty three characters long. Any unused characters at the end of the product description are filled with blanks. The product description contains product-identifying information such as manufacturer, product name, size, color, type, and etc. Box 160 shows an exemplary product description. Each flash memory page containing product descriptions is divided into 16 records as shown in table 140, each record containing one product description.

Flash memory pages L through L+760 are allocated to product keys as shown in table 170. Each flash memory page allocated to product keys holds sixty six product keys as shown in table 110 and 130. Each product key 120 consists of three elements, a product identification code 121, a page offset to the product description 122 associated with the product identification code 121, and the product description record number 123 within the product description page. Page offset 122 is the offset from the start of product description memory, page M in flash memory page table 170.

Each GTIN number includes a check digit. As described above, the check digit is redundant as it can be calculated from other digits within the GTIN. A database relating the GTIN to associated product information could include the check digit in the database key, but since the check digit is redundant, the GTIN without the check digit is also a unique product identification code. In the preferred embodiment, the product identification code stored in database memory 24 is the GTIN without the check digit. Only retail GTINs are stored, which limits the range of the product identification codes to a twelve digit number, which can be stored in the 5-byte product identification code field 121.

Product keys 120 are stored in ascending numeric order of the contained product identification codes 121. Each product key 120 requires eight bytes of storage so there are sixty six product keys per page of memory as shown in table 110 and 130. Product keys are store contiguously within the flash memory pages devoted to product key storage. Product identification codes 121 within the keys 120 are not necessarily consecutive numbers as the preferred embodiment has space for approximately 50,000 product keys and descriptions out of the approximately one trillion possible retail GTIN codes.

Flash memory page 0, shown in table 100, contains information needed by the database search algorithm. Product key page offset 102 is the page offset, from the start of flash memory, of the memory page containing the first product key entry, referred to as L in table 170. Product key entries start at the beginning of the page. Description page offset 103 is the page offset, from the start of flash memory, to the first flash memory page containing product descriptions, referred to as M in table 170. Number of keys 104 is the number of product keys currently in database memory.

The flash memory page of the product description associated with a particular product key is calculated by adding description page offset 103 and offset to description page 122 from the product key. Within that description page, the record number is the description record number 123 from the product key. The byte offset, from the start of flash memory, of the product description is then calculated as Address=memory_page*528+record_number*33

The disclosed format of product keys 120 within database memory 24 allows the product keys 120 to be accessed as an indexed array. Product keys 120 are stored contiguously and each requires 8 bytes of storage, so the byte offset within product key memory of a product key associated with an index is calculated as eight times the index value. The following array notation refers to a specific product key 120:

PK[INDEX].ELEMENT

Where PK refers to the array of product keys 120, INDEX is the index into the array and ELEMENT refers to one of the elements of product key 120, PRODID 121, PAGE 122 or RECORD 123. The array notation refers to the value of the referenced element from the indexed product key. The valid range of values for INDEX is 0 to one less than number of keys 104.

Database Search Algorithm

The database search algorithm retrieves the product description associated with a search item from the database memory 24. In the preferred embodiment, the search item is the product identification code formed by stripping the check digit from the GTIN number decoded by the product scanner.

The preferred embodiment uses a binary search algorithm to find the search item in database memory. The binary search algorithm can be used because the product identification codes 121 contained in the product keys 120 are stored in numerical order. The binary search algorithm searches database memory iteratively, each iteration determines which half of the remaining memory contains the search item, if the item is in database memory 24. The number of search iterations depends on the number of keys 104 contained in database memory 24 and is approximately equal to Iterations=ln(number of keys 104)/ln(2)

Where ln denotes the natural logarithm.

For a database of 50,000 items sixteen search iterations are needed.

Figure 5:
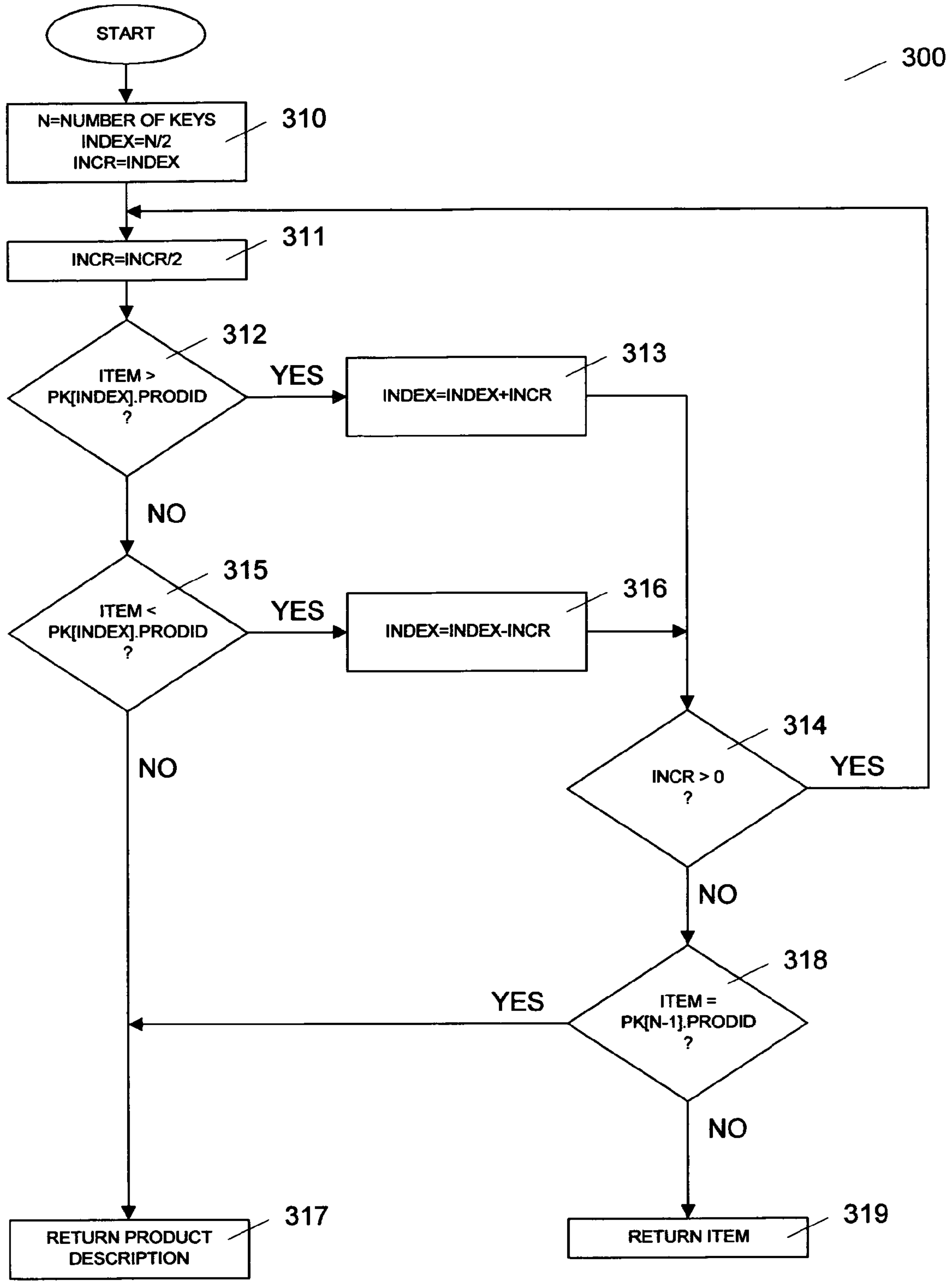
FIG. 5 is a flow chart of th binary search algorithm

Referring to FIG. 5, a flow chart of the search algorithm is shown at 300. Block 310 initializes three items. An integer variable N is initialized to the value of number of keys 104. An integer variable INDEX is initialized to the value N/2. Since N can take on even or odd values, INDEX is rounded up if N is odd. An integer variable INCR is initialized to the value of INDEX.

In block 311, the variable INCR is divided by two. In the event that the incoming value of INCR is odd, the quotient is rounded up. If the incoming value of INCR is one, INCR is set to zero.

In block 312, the search item is compared to the product identification code of the product key array indexed by the value of INDEX. If the search item is larger, then the value of INDEX is increased by the value INCR in block 313. The value of INDEX must be kept within the valid range, which has an upper limit of N−1. So, if the sum in block 313 is greater than N−1, then INDEX is set to N−1. In block 312, if the value of ITEM is not larger than the value of the product identification code of the product key array indexed by the value of INDEX, then execution proceeds to block 315.

In block 315, the search item is compared to the product identification code of the product key array indexed by the value of INDEX. If the search item is smaller, then the value of INDEX is decreased by the value INCR in block 316. The value of INDEX must be kept within the valid range, which has a lower limit of zero. So, if the sum in block 316 is less than zero, then INDEX is set to zero. In block 315, if the value of the search item is not smaller than the value of the product identification code of the product key array indexed by the value of INDEX, then the search has successfully found the product key that matches the search item and execution proceeds to block 317.

If the search has not found a match to the search item, then execution proceeds in block 314. Block 314 determines if the search is finished by comparing the value of INCR to zero. If the search is not finished, then execution will proceed to block 311 for another iteration. If the search is finished, execution proceeds to block 318.

The search algorithm 300 should successfully find a matching product key for any reasonable value of number of product keys 104. Block 318 tests the search item against the value of the product description of the last product key. In the event that the number of keys 104 is equal to a power of two, block 318 is necessary to successfully find the last product key. If the search item does not match the last product key in block 318, then the search item does not have a match in the database and execution proceeds to block 319. Block 319 returns the search item.

Block 317 executes upon a successful search. The product description associated with the search item is returned.

Printer

The product description retrieved from database memory 24 or the searched GTIN, if no match was found, is printed on printer 22 as a line of shopping list 16. One line of product description is printed for each scanned item. The accumulated printed product descriptions forms the shopping list of scanned products.

Database Maintenance

Flash memory page zero shown in table 100, contains basic database information needed to search and update database memory 24.

Database maintenance is performed by system controller 23 in conjunction with a database source connected to serial port 19. The database source has a current product database. The database source has a database version for the current database corresponding to database version 101 contained in database memory 24. Comparing the database version of the current database to database version 101 determines what database updates are needed. Database version 101 consists of a major version byte and a minor version byte. Updating to a new major version of the database requires reprogramming of the entire database memory. Updating within the same major revision to a new minor version requires applying each incremental update between the minor version indicated in database version 101 and the minor version indicated in the version of the current database.

When reprogramming the entire database memory 24, database memory 24 is erased and then reprogrammed. Incremental updates consist of adding products to the database or updating a product description associated with an existing product key. New product keys are inserted into the product key array in product identification code order, moving subsequent keys higher in memory. New product descriptions are appended to the end of product description memory. Updating an existing product description comprises overwriting the existing product description. Each page of database memory to be modified is read, updated, and written back into database memory 24.

RFID System

Radio frequency identification (RFID) is a developing product identification technology. RFID product identification is similar to barcode technology in that there are labels affixed to objects and there are product identification scanners or readers. Instead of reading the label with reflected light, RFID systems use radio frequency (RF) signals to transfer the product identification code from the label to the reader. The reader or scanner in an RFID system transmits an RF signal to the RFID tag. When illuminated with an RF reader transmission, the RFID label stores some of the received RF energy and then transmits its programmed product identification code back to the reader. The RFID label contains an electronic circuit that is powered by the reader signal.

The product identification code programmed into the RFID tag may be the same GTIN assigned for UPC labeling. In an embodiment of the current invention, the RFID reader replaces the UPC scanner. System controller 23 receives the product identification code from the RFID reader, retrieves the product description associated with the product identification code from database memory 24, and prints the product description on printer 22 to form shopping list 16.

PDA Interface

Figure 6:
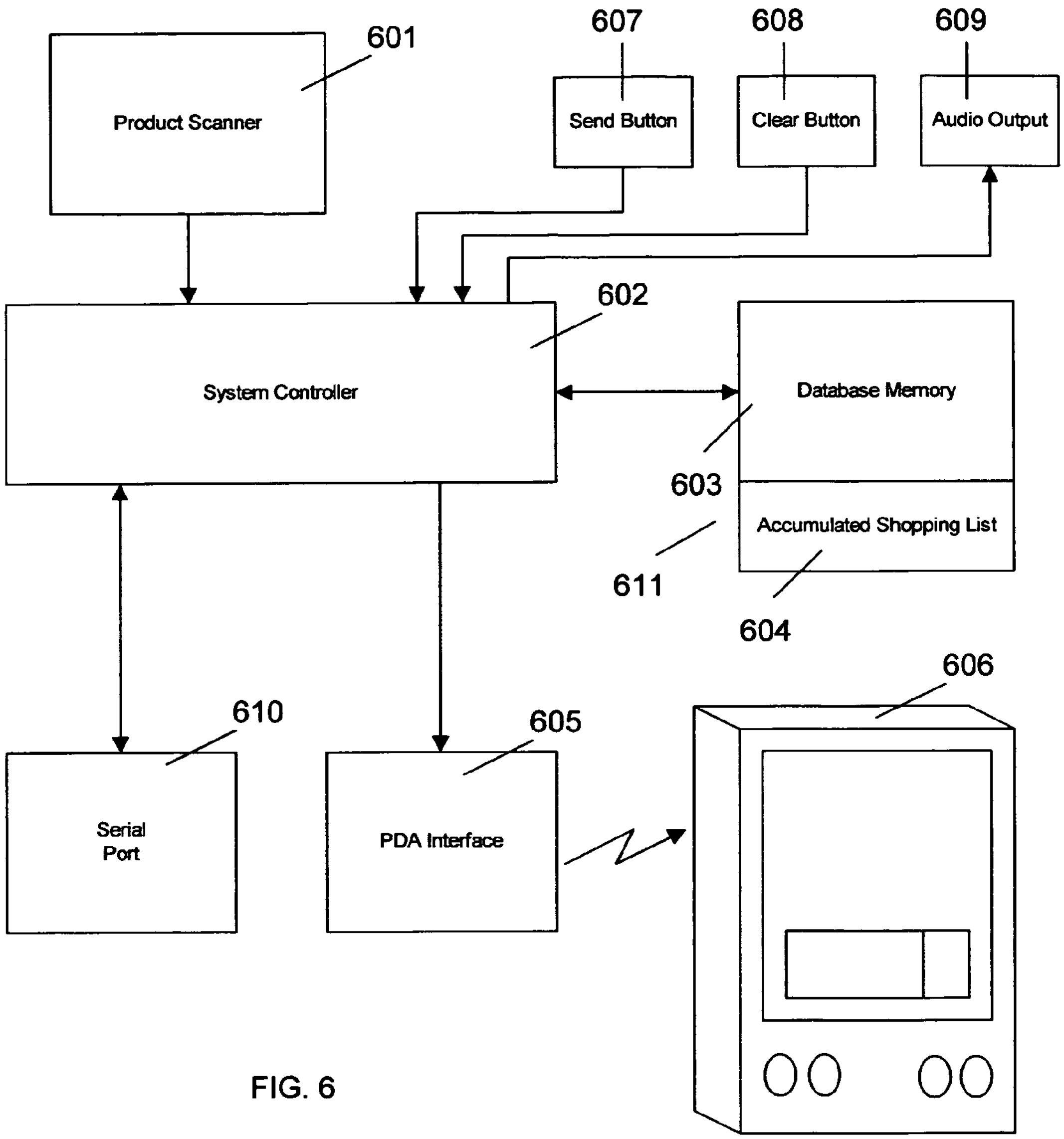
FIG. 6 is a block diagram of the shopping list generator with a PDA interface

FIG. 6 shows a block diagram of another embodiment of the current invention in which the generated shopping list is sent to an electronic organizer 606, such as a personal digital assistant (PDA). As product identification codes are read from product scanner 601, which may be a UPC scanner or an RFID scanner, a shopping list comprising a list of product identification codes is accumulated by system controller 602 in nonvolatile memory 604. Database memory 603 and shopping list memory 603 are located within the same nonvolatile memory chip.

IrDA link 605 is an infrared link used to transfer data from the shopping list generator to PDA 605. IrDA, an interface promulgated by the Infrared Data Association, is a known interface wherein data is modulated onto an infrared carrier. Data transfers are initiated by the sender. The receiving PDA receives data in the form of a known data type, which in the present invention may be a to do list, where items may be checked off, but may alternately be in the form of a text list.

Two operator controls, send button 607 and clear button 608, are used in this embodiment. Send button 607 initiates a transfer of accumulated shopping list 604 to PDA 606. Transfer of shopping list 604 is performed via IrDA link 605. When a transfer is initiated, the products descriptions associated with each of the product identification codes stored in accumulated shopping list 604 are retrieved from database memory 24 and sent to PDA 606. Product identification codes not found in database memory 603 are sent in the transferred list as product identification codes.

Clear button 608 clears accumulated shopping list 604 from nonvolatile memory, usually upon successful transfer of the list to the PDA.

Audio output 609 provides feedback to the user indicating a successful scan. System controller 602 signals audio output 609 to produces distinctive tones for successful and unsuccessful scans.

This embodiment of the invention stores product identification codes in accumulated shopping list 604, however the invention should not be so limited. Product descriptions could also be stored to produce an accumulated shopping list. The current invention should be construed to include storage of a representation of scanned product labels that leads to a shopping list in the PDA.

The IrDA interface described above is one of the interfaces found on PDAs. Other interfaces include RF interfaces Bluetooth and WiFi. These interfaces could also transfer the accumulated shopping list to the PDA. The current invention should be construed to cover these interfaces as well.

Although a preferred embodiment is described herein, it will be understood that the invention is capable of numerous modifications, rearrangements and substitutions of parts without departing from the scope of the invention as defined in the claims.

What is claimed is:

1. A stand alone apparatus for scanning products marked with product labels encoding product identification codes to generate a shopping list, said apparatus comprising:

a) a product scanner for scanning product labels and producing product identification codes therefrom;

b) a database associating product identification codes with product descriptions;

c) a system controller connected to said scanner and connected to said database, said controller receiving said product identification codes, querying said database for said product descriptions, and accumulating a shopping list; and d) outputting said shopping list.

2. The apparatus of claim 1 further comprising a printer, and said outputting said shopping list comprises printing said shopping list on said printer.

3. The apparatus of claim 1 further comprising an interface to a personal digital assistant (PDA), wherein said outputting said shopping list comprises sending said shopping list via said PDA interface.

4. The apparatus of claim 3 wherein said interface is an infrared data interface.

5. The apparatus of claim 3 wherein said interface is an RF interface.

6. The apparatus of claim 1 wherein said database comprises a database memory, said database memory comprising a nonvolatile semiconductor memory.

7. The apparatus of claim 1 wherein said product scanner is a barcode scanner.

8. The apparatus of claim 1 wherein said product scanner reads radio frequency tags.

9. A method for producing a shopping list, said method comprising:

a) scanning product labels with a product scanner and producing product identification codes therefrom;

b) retrieving product descriptions associated with said product identification codes from a database;

c) accumulating a shopping list; and d) outputting said shopping list.

10. A stand alone apparatus for scanning products marked with product labels encoding product identification codes to generate a shopping list, said apparatus comprising:

a) a product scanner for scanning product labels and producing product identification codes therefrom;

b) a printer for printing the shopping list;

c) a database associating product identification codes with product descriptions;

d) an interface, said interface operative with an external database source to update said database; and e) a system controller connected to said scanner, connected to said database, connected to said interface, and connected to said printer, said controller receiving said product identifying codes, querying said database for said associated product descriptions, and printing the shopping list on said printer.

11. The apparatus of claim 10 wherein said product scanner is a barcode scanner.

12. The apparatus of claim 10 wherein said product scanner reads radio frequency.

* * * * *